Figure 1:
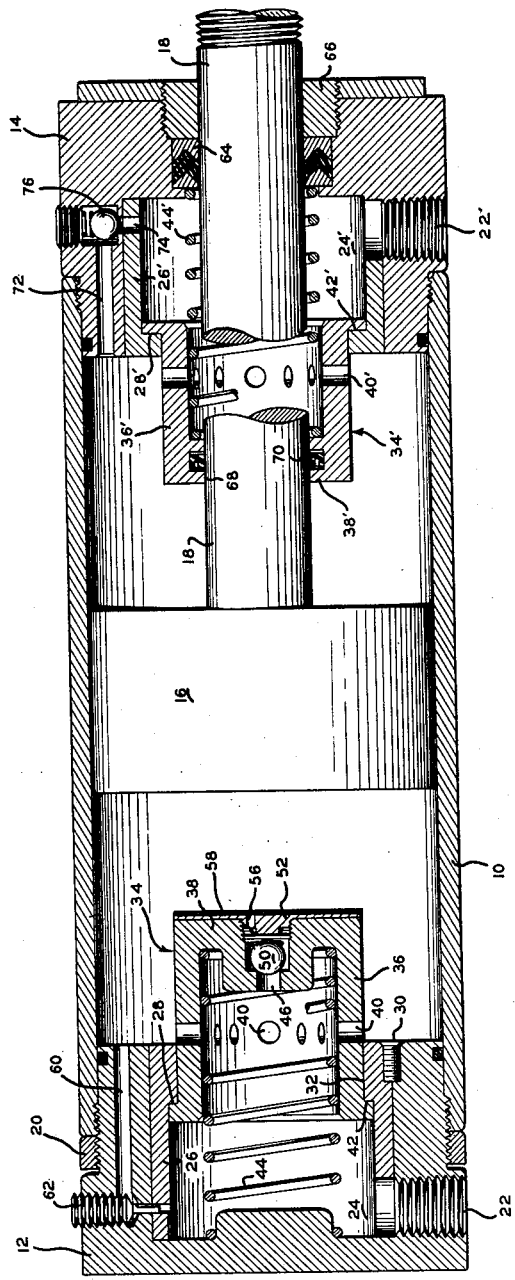

Dec. 22, 1964    H. D. CORWIN    3,162,092
CYLINDER CUSHION STRUCTURE
Filed July 9, 1962    2 Sheets-Sheet 1

INVENTOR
HOWARD D. CORWIN
BY Beaman & Beaman
ATTORNEY

Dec. 22, 1964   H. D. CORWIN   3,162,092
CYLINDER CUSHION STRUCTURE
Filed July 9, 1962   2 Sheets-Sheet 2

INVENTOR
HOWARD D. CORWIN
BY Beaman & Beaman
ATTORNEY

United States Patent Office 3,162,092
Patented Dec. 22, 1964

3,162,092
CYLINDER CUSHION STRUCTURE
Howard D. Corwin, Jackson, Mich., assignor to Tomkins-Johnson Company, Jackson, Mich., a corporation of Michigan
Filed July 9, 1962, Ser. No. 208,306
6 Claims. (Cl. 91—26)

The invention pertains to an expansible motor construction, and particularly relates to an expansible motor having decelerating means for cushioning the end of the stroke of the piston.

Expansible motor constructions including a cylinder having a head at each end and a piston slideably mounted within the cylinder having a rod extending through one of the heads, often employ cushioning means for decelerating the piston movement as it approaches the cylinder heads. Such cushioning means are particularly desirable with expansible motors employing gaseous pressure mediums such as compressed air. Generally, such cushioning means employ the air or other gas within the cylinder as the means for decelerating the piston travel. As the piston approaches the head through which the medium within the cylinder is being exhausted, means are provided for limiting the rate at which the exhaust gas leaves the cylinder. As the gas trapped between the head and the piston is compressible, the piston movement will cause a high compression of this gas which functions as the cushion. Bleed-off means are provided for regulating the rate at which the "cushion" gas is exhausted from the cylinder.

In the majority of expansible motor constructions employing cushioning means, the cushioning structure includes an orifice defined in the cylinder heads through which the pressurized medium is introduced or exhausted from the cylinder, depending on the desired direction of piston travel. A plug or valve is mounted upon the piston, or piston rod, which is received within the cylinder head orifice, thus preventing the gas from being exhausted from the cylinder through the orifice during the final movements of the piston. One of the problems encountered with this type of cushioning apparatus, wherein a plug is mounted upon the piston, lies in the occurrence of wear and misalignment between the plug and the orifice surfaces mounted upon the head which engage the plug. The orifice surfaces and the plug surfaces must be accurately machined and dimensioned to provide an effective seal to insure proper operation of the cushioning structure. To aid in the entrance of the plug into the orifice, the plug is often formed with a tapered surface, and must necessarily be longer than is desired. Such extended length of the plug often results in a cylinder of a length considerably greater than the working stroke thereof. Also, misalignment problems often occur between the plug and the orifice surfaces due to transverse loads being imposed on the piston rod tending to "cock" the piston within the cylinder. Such misalignment often causes the plug or orifice to wear rapidly on one side and significantly shortens the life of the cushion apparatus and expansible motor.

To alleviate the above-mentioned problems, it is an object and purpose of the invention to permanently locate the plug or valve within the orifice defined in the cylinder heads. An advantage of this construction is that it permits a very accurate mating fit to be maintained between the valve or plug and orifice, and eliminates misalignment problems. As the valve is not totally withdrawn from the orifice, as in the more conventional construction, unusual accuracy and tolerances may be maintained, and a long expansible motor life can be produced. In the practice of the invention, the valve is operated by the piston which engages the valve as it nears the cylinder head.

Another object of the invention is to provide expansible motor cushioning means wherein the cushioning components are of a readily manufacturable configuration, and wherein assembly of the cushioning structure may be easily accomplished.

A further object of the invention is to provide expansible motor cushioning structure, wherein the cushioning apparatus is of a general cylinder and piston arrangement, wherein the valve may function as a piston and does not completely withdraw from the cylinder head orifice or chamber associated therewith.

A further object of the invention is to provide expansible motor cushioning structure which is capable of functioning as a governor to prevent excessive piston velocities whereby the cushioning structure will slow the piston travel if its velocity becomes excessive and will automatically restore the piston velocity upon the excessive velocity being remedied.

Figure 2:
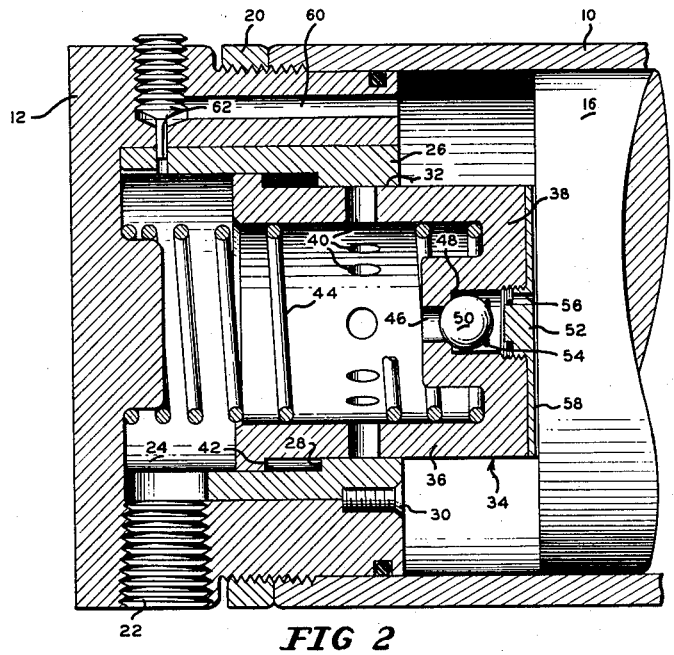
Figure 3:
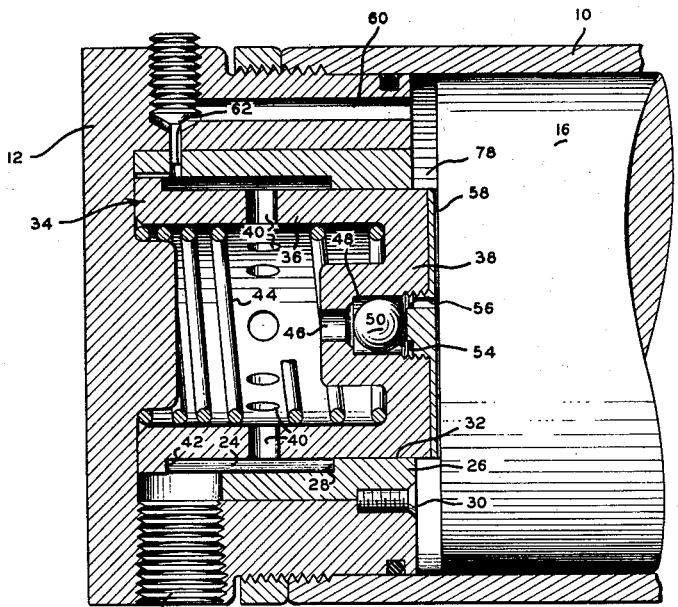

These and other object of the invention arising from the details and relationships of the components of an embodiment thereof, will be apparent from the following description and accompanying drawings wherein:

FIG. 1 is an elevational, sectional view of an expansible motor in accord with the invention showing the cushioning valves in the fully open positions, FIG. 2 is an enlarged detail, sectional view of the left cylinder head of the embodiment of FIG. 1, showing the piston engaging the valve and partially displacing the valve into the chamber, and FIG. 3 is a detail enlarged view, similar to that of FIG. 2, showing the valve fully bottomed and the check valve in the position at the beginning of the return stroke but prior to piston movement.

An embodiment of the invention will be apparent from FIG. 1 wherein an expansible motor employing the cushioning structure of the invention is shown. The expansible motor includes a tubular cylinder 10 having heads 12 and 14 associated with the ends thereof. A piston 16 is slideably mounted within the cylinder, and conventional sealing rings, not shown, may be employed to establish a sealing connection between the piston and the inner diameter of the cylinder. The piston 16 is provided with a cylindrical piston rod 18 which extends through the head 14.

The cylinder 10 is internally threaded adjacent its ends to receive the external threads of the heads 12 and 14. An annular lock nut 20 is also threaded upon the threads of the head 12 whereby the head 12 may be locked to the cylinder. The head 14 is not shown with a lock nut, but may be provided with the same if so desired. Threaded ports 22 and 22' are provided in the heads 12 and 14, respectively, and communicate with chambers defined therein.

Although the heads 12 and 14 are substantially identical in basic respects, the fact that the piston rod 18 extends through the head 14 requires modification of head 14 to accommodate the piston rod. The following description will be directed to the cylinder head 12, and equivalent components which are found in the head 14 are indicated by primes.

The chamber 24 of the head 12 is defined within an annular liner or collar 26 which is provided with an internal shoulder 28 and is held in the head by a screw 30 threaded into a threaded hole formed in both the collar and head. The cylindrical surface 32 of the collar is accurately machined so as to maintain a sliding, sealing engagement with cup-shaped valve 34. The valve 34 is of a cylindrical configuration having a side wall 36 and an end wall 38. The open end of the valve communicates with the chamber 24, and a plurality of circumferentially spaced ports, or holes 40, are defined in the side wall of the valve. The valve 34 is also provided with an annular shoulder 42 for abutting engagement with the collar shoulder 28. A compression spring 44 is interposed between the head 12 and the valve end wall 38, tending to bias the valve 34 to the position shown in FIG. 1, wherein shoulders 28 and 42 abuttingly engage.

In the disclosed embodiment, the valve end wall 38 includes a passage 46, opening into a chamber 48 in which a ball check valve 50 is located. A cap 52 may be threadedly connected to the end of the valve end wall, and functions to locate the ball check within the chamber 48. A spring 54 will normally maintain the ball 50 in sealed engagement with the passage 46. An opening 56 defined in the cap 52 permits chamber 48 to communicate with the interior of cylinder 10. A diametrical groove 58 defined on the cap 52 permits the pressurized medium flowing through the opening 56 to flow into the cylinder even though piston 16 is engaging cap 52, as shown in FIG. 3.

Each head 12 and 14 is provided with a bleed-off conduit 60 communicating with the interior of the cylinder 10 adjacent the associated head, and also communicating with the associated chamber defined within the head. An adjustable needle valve 62 is located in the bleed-off passage 60 to regulate the flow through the passage. It will be appreciated that appropriate openings are defined in the collar 26 to accommodate the bleed-off passage and the ports 22. A similar arrangement is employed with the head 14. However, the bleed-off passages and needle valve do not appear in the section view of FIG. 1.

Cylinder head 14 is provided with a sealing gland 64 and a packing nut 66 for sealing the piston rod 18. Also, the valve end wall 38' is provided with an opening 68 which is coaxial with the cylinder and chamber 24' for permitting the piston rod 18 to extend through the valve 34'. Sealing means 70 seal the valve with respect to the rod, yet permit the valve to be axially displaced with respect to the rod.

The head 14 is provided with passage means 72 and 74, having ball check means 76 defined therein for limiting the fluid-flow through the passage means 72–74 from the chamber 24' to the interior of the cylinder 10. The ball check 76 and the associated passage means provide the equivalent function as that of passage 46, opening 56 and ball check 50 employed with the valve 24. It is to be understood that the passage and check valve structure 46–58 of valve 34 may be replaced by passages and a ball check defined and mounted in the head 12 in the manner similar to that shown in the head 14. In such instance the valve end wall 38 would be modified to eliminate the chamber 48 and the cap 52 would become unnecessary.

The operation of the cushioning structure in accord with the invention is as follows:

Appropriate conduit lines are attached to ports 22 and 22' for communication with the associated chambers 24 and 24'. Assuming the piston 16 to be in the central location as shown in FIG. 1, an introduction of pressurized fluid into chamber 24' will permit the fluid to flow through the ports 40' into the cylinder 10 on the right of piston 16, FIG. 1. Upon a pressurized fluid being introduced through the port 22', the port 22 will be opened to exhaust. The pressurized fluid, usually air, on the right of piston 16 will cause the piston to move to the left toward the head 12.

Movement of the piston 16 to the left takes place at a rate proportionate to the quantity and pressure of the air being injected into the cylinder, the load imposed upon the piston rod, and the area of the piston rod. As the piston 16 approaches the head 12, it will engage the cap 52 upon end wall 38 of the valve 34, and thereby push the valve into the chamber 24, compressing the spring 44. Prior to the piston engaging the valve 34, the air on the left of the piston has been exhausting through the ports 40 into the chamber 24. Upon the valve 34 being moved into the chamber 24 to the extent wherein openings 40 are axially aligned with the collar 26, FIG. 2, the air within the cylinder 10 can no longer exhaust therethrough. At this time the air pressure within the cylinder on the left of the piston will become compressed and function as a cushion to decelerate the piston travel. The air between piston 16 and head 12 will now exhaust through the bleed-off conduit 60 into the chamber 24 through the needle valve 62, and such exhausting takes place at the rate predetermined by the needle valve setting. The piston will then move toward the head 12 at the desired decelerated rate until the valve 34 bottoms against the chamber 24, as shown in FIG. 3.

To reverse the piston travel, pressurized air is supplied to the port 22 and the port 22' is open to exhaust. Initially, the air will flow into the chamber 24 through the openings 40, and from the chamber 24 through the passage 46, unseating the ball check valve 50, as shown in FIG. 3. The air flowing past the ball check valve 50 flows through opening 56 into groove 58, pressurizing the annular space 78. As the space 78 becomes pressurized, the piston 16 begins to move toward the right, and the valve 34 will move in a like direction, the cap upon end wall 38 being maintained in engagement with the piston 16 by the biasing action of the spring 44 and the air within chamber 24. Upon the valve 34 moving to the right to the extent wherein the ports 44 communicate with the cylinder 10, the cylinder will then be charged through the ports 40 and the ball 50 will seat.

Movement of the piston 16 to the right continues until the piston engages the valve 34'. Movement of the valve 34' into the chamber 24' will close the ports 40' with respect to the interior of the cylinder 10 and produce a cushioning action, as described above. When it is desired to again move the piston 16 toward the right, the annular cylinder space at the right of the piston 16 is charged through the passages 72, 74 and the check valve 76.

Therefore, it will be appreciated that the valves 34 and 34' will be maintained at all times within the associated head and that the likelihood of misalignment between the valve and collar is eliminated. A positive cushioning action is provided at the ends of the piston strokes, and the fact that all the cushioning mechanism is located in the heads, facilitates assembly and permits ready maintenance of the motor. If desired, the holes 40, which extend through the valve side wall, could be replaced by grooves defined on the outer surface of the valve end walls extending into the chamber, thus establishing communication between the chamber and cylinder when the valve is in its extended position.

A feature of the described cushioning apparatus lies in its ability to serve as a governor to prevent excessive speed of the piston rod. For instance, should the load be removed from the piston rod and the velocity of the piston be excessive, such extraordinary velocity would cause a pressure to be built upon the exhaust side of the piston. The build-up of the exhausting air, if sufficiently high, would act upon the valve end wall 38 to push the valve into its collar and chamber against the action of the spring 44. Such an action will throttle the air exhausting through the ports 40 producing a cushioning pressure on the exhaust side of the piston, thus retarding the piston velocity. The governing effect produced by the structure would be dependent upon the size of the effective area of the valve end wall, the size and numbers of the ports 40, and the force exerted by the spring 44. By correlating these variables as desired, the governing effect produced by the valve 34 may be regulated. As the spring 44 will push the valve 34 outwardly as the exhaust pressure decreases, the governing effect of the valve will be automatic and require no attention by the operator.

It is understood that various modifications to the invention may be apparent to those skilled in the art without departing from the spirit and scope thereof, and it is intended that the invention be defined and limited only by the following claims:

I claim:

1. An expansible motor comprising, in combination, a tubular cylinder, a piston slideably received within said cylinder, a head mounted on each end of said cylinder sealingly associated therewith, a piston rod affixed to said piston extending through one of said heads, a port defined in at least one of said heads, a chamber defined in said one head in communication with said port, said chamber being of cylindrical configuration having an axis coinciding with the axis of said cylinder, a cylindrical cup-shaped valve slideably received within said chamber, said valve having an open end opening toward said chamber, a side wall and an end wall disposed toward said cylinder and piston, a compression spring within said chamber and valve biasing said valve toward said piston, abutment means limiting movement of said valve toward said piston, an opening defined in the side wall of said valve communicating with said chamber and communicating with said cylinder upon said valve projecting its maximum extent toward said piston, said piston engaging said valve upon approaching said one head whereby predetermined movement of said valve by said piston closes said opening to said cylinder, and a bleed-off conduit defined in said one head establishing communication between said cylinder and said chamber.

2. An expansible motor comprising, in combination, a tubular cylinder, a piston slideably received within said cylinder, a head mounted on each end of said cylinder sealingly associated therewith, a piston rod affixed to said piston extending through one of said heads, a port defined in at least one of said heads, a chamber having a cylindrical wall coaxially related to said cylinder defined in said one head and in communication with said port, a cup-shaped valve slidingly and sealingly received within said chamber having a cylindrical side wall, an end wall and opening into said chamber, a spring within said chamber interposed between said one head and valve biasing said valve end wall toward said cylinder, engageable abutment means defined on said one head and valve limiting movement of said valve into said cylinder, port means defined in said valve side wall establishing communication between said chamber and cylinder upon said abutment means engaging, said valve end wall being engageable by said piston whereby said piston will move said valve into said chamber upon nearing said one head and closing said port means, a bleed-off conduit defined in said one head in communication with said cylinder and chamber, passage means connecting said cylinder and chamber, and a check valve within said passage means permitting fluid-flow from said chamber to said cylinder.

3. In an expansible motor as in claim 2, wherein a port, chamber, valve, bleed-off conduit and passage means are defined in each of said cylinder heads, an opening defined in the end wall of the valve associated with the head through which said piston rod extends, said piston rod extending through said end wall opening, and seal means interposed between said end wall opening and said piston rod.

4. In an expansible motor as in claim 2, wherein said passage means is defined in said valve end wall.

5. An expansible motor comprising, in combination, a tubular cylinder, a piston slideably received within said cylinder, a head mounted on each end of said cylinder sealingly associated therewith, a piston rod affixed to said piston extending through one of said heads, a port defined in each of said heads, a chamber defined in each of said heads in communication with the adjacent port, said chambers being of cylindrical configuration having an axis coinciding with the axis of said cylinder, a cylindrical cup-shaped valve slideably received within each of said chambers, said valves each having an open end opening toward the associated chamber, a side wall and an end wall disposed toward said cylinder and piston, a compression spring within each of said chambers and valves biasing said valves toward said piston, abutment means limiting movement of said valves toward said piston, an opening defined in the side wall of each of said valves communicating with the associated chamber and communicating with said cylinder upon the valves projecting their maximum extent toward said piston, said piston engaging a valve upon approaching a head whereby predetermined movement of the engaged valve by said piston closes the associated opening to said cylinder, and an opening defined in the end wall of the valve associated with the head through which said piston rod extends, said piston rod extending through said valve end wall opening, and sealing means sealing said end wall with respect to said piston rod.

6. An expansible motor comprising, in combination, a tubular cylinder, a piston slideably received within said cylinder, a head mounted on each end of said cylinder sealingly associated therewith, a piston rod affixed to said piston extending through one of said heads, a port defined in at least one of said heads, a chamber defined in said one head in communication with said port, said chamber being of cylindrical configuration having an axis coinciding with the axis of said cylinder, a cylindrical cup-shaped valve slideably received within said chamber, said valve having a open end opening toward said chamber, a side wall and an end wall disposed toward said cylinder and piston, a compression spring within said chamber and valve biasing said valve toward said piston, abutment means limiting movement of said valve toward said piston, an opening defined in the side wall of said valve communicating with said chamber and communicating with said cylinder upon said valve projecting its maximum extent toward said piston, said piston engaging said valve upon approaching said one head whereby predetermined movement of said valve by said piston closes said opening to said cylinder, and passage means defined in said one head interconnecting said chamber and said cylinder, and a check valve within said passage means permitting fluid-flow through said passage means from said chamber to said cylinder.

References Cited in the file of this patent
UNITED STATES PATENTS

| | | |
|---|---|---|
| 1,833,216 | Hanna | Nov. 24, 1931 |
| 1,852,507 | Davis | Apr. 5, 1932 |
| 2,338,845 | Gunner et al. | Jan. 11, 1944 |
| 2,778,342 | Ringman | Jan. 22, 1957 |
| 2,786,452 | Tucker | Mar. 26, 1957 |